(12) United States Patent
Dhondt

(10) Patent No.: US 6,804,635 B1
(45) Date of Patent: Oct. 12, 2004

(54) GENERATING A THREE-DIMENSIONAL MESH FOR FINITE ELEMENT ANALYSIS

(75) Inventor: Guido Dhondt, Gröbenzell (DE)

(73) Assignee: MTU Aero Engines GmbH, Munich (DE)

(*) Notice: Subject to any disclaimer, the term of this patent is extended or adjusted under 35 U.S.C. 154(b) by 604 days.

(21) Appl. No.: 09/640,365

(22) Filed: Aug. 16, 2000

(30) Foreign Application Priority Data

Aug. 16, 1999 (EP) .............................. 99115188

(51) Int. Cl.[7] .............................................. G06F 17/50
(52) U.S. Cl. ............................. 703/2; 703/7; 345/419
(58) Field of Search ................... 703/2, 22, 7; 345/419, 345/473, 474, 427, 440, 622

(56) References Cited

U.S. PATENT DOCUMENTS

| | | | |
|---|---|---|---|
| 5,113,490 A | 5/1992 | Winget | |
| 5,731,817 A | 3/1998 | Hahs, Jr. et al. | |
| 5,774,696 A | * 6/1998 | Akiyama | 395/500 |
| 5,936,869 A | 8/1999 | Sakaguchi et al. | |
| 6,392,647 B1 | * 5/2002 | Migdal et al. | 345/423 |
| 6,445,390 B1 | * 9/2002 | Aftosmis et al. | 345/421 |

OTHER PUBLICATIONS

S. Pissanetzky, *Kubik: An Automatic Three–dimensional Finite Element Mesh Generator,* Int. J. Numer. Meth. Engng., 17, 225–269, 1981).

Shephard, et al., *Automatic Three–dimensional Mesh Generation by the Finite Octree Technique,* Int. J. Numer. Meth. Engng., 32, 709–749, 1991).

Li et al., *Hexahedral Meshing Using Midpoint Subdivision and Integer Programming,* Comput. Methods Appl. Mech. Engng., 124, 171–193, 1995).

R. Schneiders, *A Grid–based Algorithm for the Generation of Hexahedral Element Meshes,* Engineering with Computers, 12, 168–177, 1996).

Blacker et al., *Paving: a New Approach to Automated Quadrilateral Mesh Generation,* Int. J. Numer. Meth. Engng., 32, 811–847, 1991.

G. Dhondt, *Cutting of a 3–D Finite Element Mesh for Automatic Mode I Crack Propagation Calculations,* Int. J. Numer Meth. Engng. 42, 749–772 (1998).

* cited by examiner

*Primary Examiner*—Thai Phan
(74) *Attorney, Agent, or Firm*—Kenyon & Kenyon

(57) ABSTRACT

A method for generating a three-dimensional mesh for a structure to be subjected to three-dimensional structural finite element analysis entails the steps of providing a triangulation of the surface of said structure, providing a master mesh encompassing said structure, processing, by performing at least one of the steps of cutting and remeshing, at least those elements of the master mesh that are intersected by said triangulation such that the elements internal to said structure correspond to elements of said three-dimensional mesh each having a first predetermined topological property, and discarding elements of the master mesh external to said structure. The three-dimensional meshes are generated in a fully or at least partially automated fashion. The generated three-dimensional meshes have good properties for the subsequent finite element calculations.

11 Claims, 13 Drawing Sheets

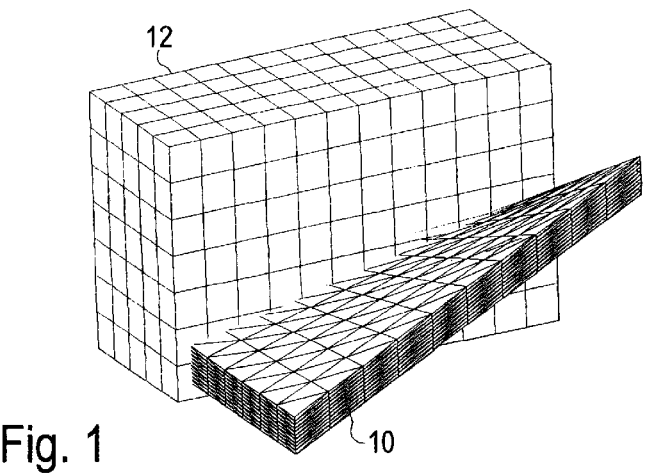
Fig. 1
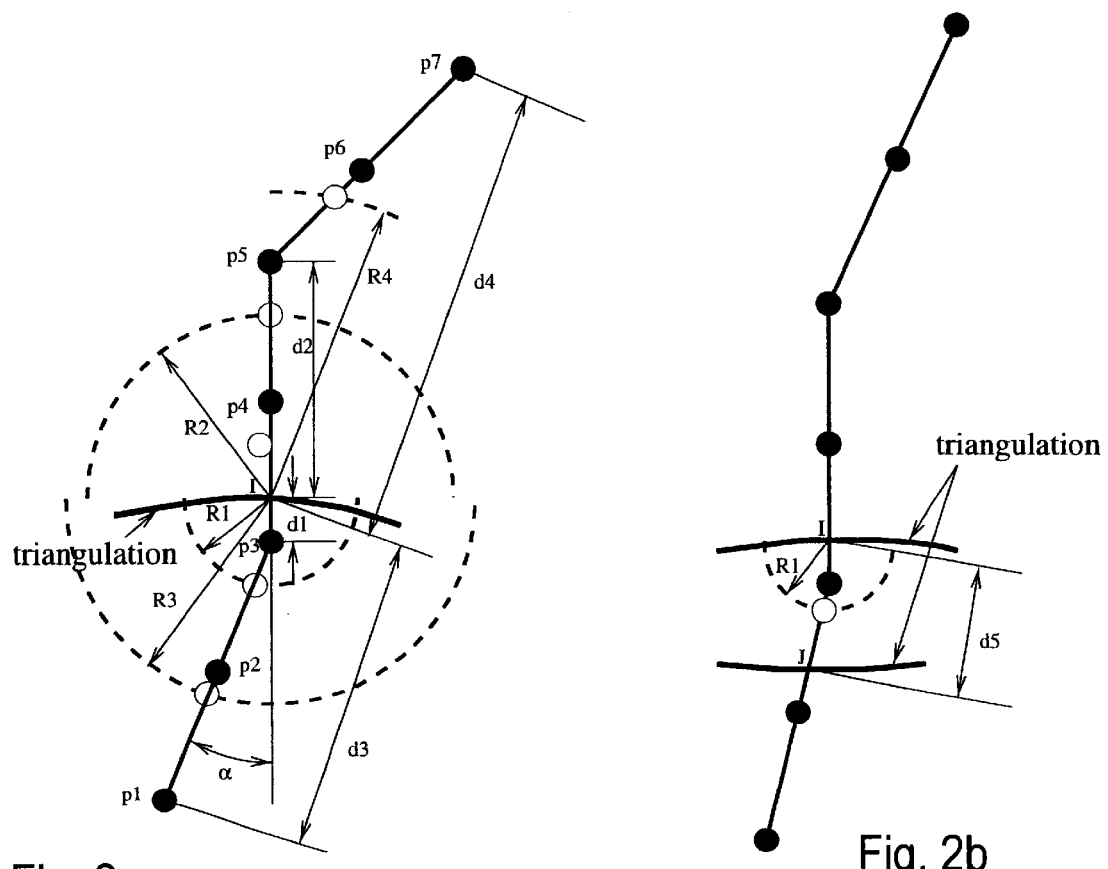
Fig. 2a
Fig. 2b

GENERATING A THREE-DIMENSIONAL MESH FOR FINITE ELEMENT ANALYSIS

FIELD OF THE INVENTION

The present invention concerns the field of computer aided design and simulation. In this field three-dimensional (3-D) structural finite element analysis is often used to calculate or simulate various mechanical properties of components during all phases of the design process. In particular, the present invention is concerned with an early step of finite element analysis, namely the generation of three-dimensional meshes for a given structure to be analyzed.

BACKGROUND INFORMATION

In spite of increasing computing power, the generation of three-dimensional meshes for three-dimensional structural finite element calculations can be a very time-consuming task. This is especially true if hexahedral elements are to be used in the mesh. In the past, several proposals have been made ranging from modular building blocks (see S. Pissanetzky, "KUBIK: an automatic three-dimensional finite element mesh generator", Int. J. Numer. Meth. Engng., 17, 255–269, 1981) to finite octree techniques (see M. S. Shephard and M. K. Georges, "Automatic three-dimensional mesh generation by the finite octree technique", Int. J. Numer. Meth. Engng., 32, 709–749, 1991), midpoint division (see T. S. Li, R. M. McKeag and C. G. Armstrong, "Hexahedral meshing using midpoint subdivision and integer programming", Comput. Methods Appl. Mech. Engng., 124, 171–193, 1995) and mesh projection near the free boundary (see R. Schneiders, "A grid-based algorithm for the generation of hexahedral element meshes", Engineering with Computers, 12, 168–177, 1996). An overview of these and other known techniques is given in the "Handbook of Grid Generation", edited by J. F. Thompson, B. K. Soni and N. P. Weatherill, CRC Press London, 1998. However, in spite of all these attempts, the ultimate goal of a fully automatic tool to create a purely hexahedral mesh containing a reasonable number of elements for an arbitrary structure still has not been reached.

SUMMARY OF THE INVENTION

The present invention has the objective of fully or at least partially achieving this goal. In other words, the object of the present invention is to provide a method for generating a three-dimensional, preferably hexahedral, mesh for a structure to be subjected to three-dimensional structural finite element analysis, wherein said method is automated fully or at least to a substantial extent, and wherein the generated three-dimensional mesh has good properties for the subsequent finite element calculations. Preferably, the generated mesh should on the one hand be fine enough to allow accurate finite element calculations and on the other hand have as few elements as possible to reduce the required amount of computation. This balance is normally hard to achieve and often requires some manual interaction.

The invention can be practised performing the described processes in different order or in an interleaved or semi-parallel or parallel fashion.

The present invention is based on the fundamental idea to use a cutting procedure that has originally been developed for automatic crack propagation calculations for the generation of a three-dimensional mesh. A description of this cutting procedure in the context of crack propagation calculations can be found in two articles by the present inventor titled "Automatic 3-D mode I crack propagation calculations with finite elements" (published in Int. J. Numer. Meth. Engng., 41, 739–757, 1998) and "Cutting of a 3-D finite element mesh for automatic mode I crack propagation calculations" (published in Int. J. Numer. Meth. Engng., 42, 749–772, 1998). The disclosure of these two articles is expressly incorporated by reference into the present specification.

The process in accordance with the present invention is to encompass the structure by a master mesh and to cut this master mesh along the external boundaries of the structure. The master mesh preferably is a regular 20-node brick mesh, and the surface of the structure, which does not have to be connected, preferably is described by a triangular mesh.

Using this basic scheme, a three-dimensional mesh suitable for three-dimensional finite element analysis can be generated in a fully or partially automatic fashion. Experiments have shown that finite element calculations using meshes generated by the present invention yield a level of accuracy that is similar to that obtained using a prior art mesh generator requiring a large amount of human interaction and human effort.

In exemplary embodiments of the invention, the three-dimensional mesh is a hexahedral mesh, in particular a mesh having 20-node elements. However, the basic idea of the invention as outlined above is applicable to other mesh topologies as well.

In accordance with the invention, one may use cutting and/or remeshing steps for processing the elements of the master mesh that are intersected by the triangulation. For example, it is possible to cut the elements in order to obtain cut elements having a so-called 'simple topology'. These cut elements may then be subjected to remeshing to generate 20-node brick elements. The remeshing sub-step may also ensure further desirable properties of the mesh elements generated by the method. In some embodiments the elements resulting from the remeshing sub-step are further optimized, for example by a smoothing operation.

An exemplary embodiment of the invention starts with the step of generating a suitable master mesh, based on the triangulation of the structure's surface. Then, the master mesh elements which are intersected by the triangulation are determined. A 20-node brick element can be intersected in different ways leading to several cutting topologies of which seven are called simple. All other topologies are reduced to these simple ones by appropriate cutting techniques. For each of the simple topologies a remeshing scheme is applied, yielding new 20-node brick elements only. Application of these schemes to the cut elements leads to a fine 20-node element mesh on both sides of the triangulation. Finally, the elements external to the body are discarded.

In some embodiments the newly generated elements are connected to the underlying elements by multiple point constraints (MPCs), or the fine structure is continued into the deeper element layers. Pursuing the latter approach till exhaustion, a pure 20-node brick element mesh may also be obtained.

BRIEF DESCRIPTION OF THE DRAWINGS

FIG. 1 shows a triangulated structure and an automatically generated master mesh.

FIG. 2a and FIG. 2b illustrate a master mesh modification procedure.

FIG. 11b shows an enlarged representation of the drive arm of FIG. 11a.

DETAILED DESCRIPTION

Figure 3:
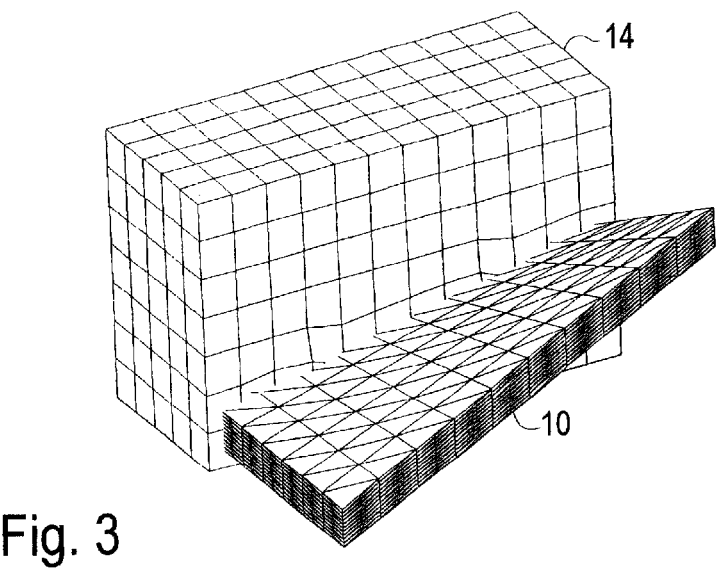
FIG. 3 shows the triangulated structure of FIG. 1 and a modified master mesh.
Figure 14:
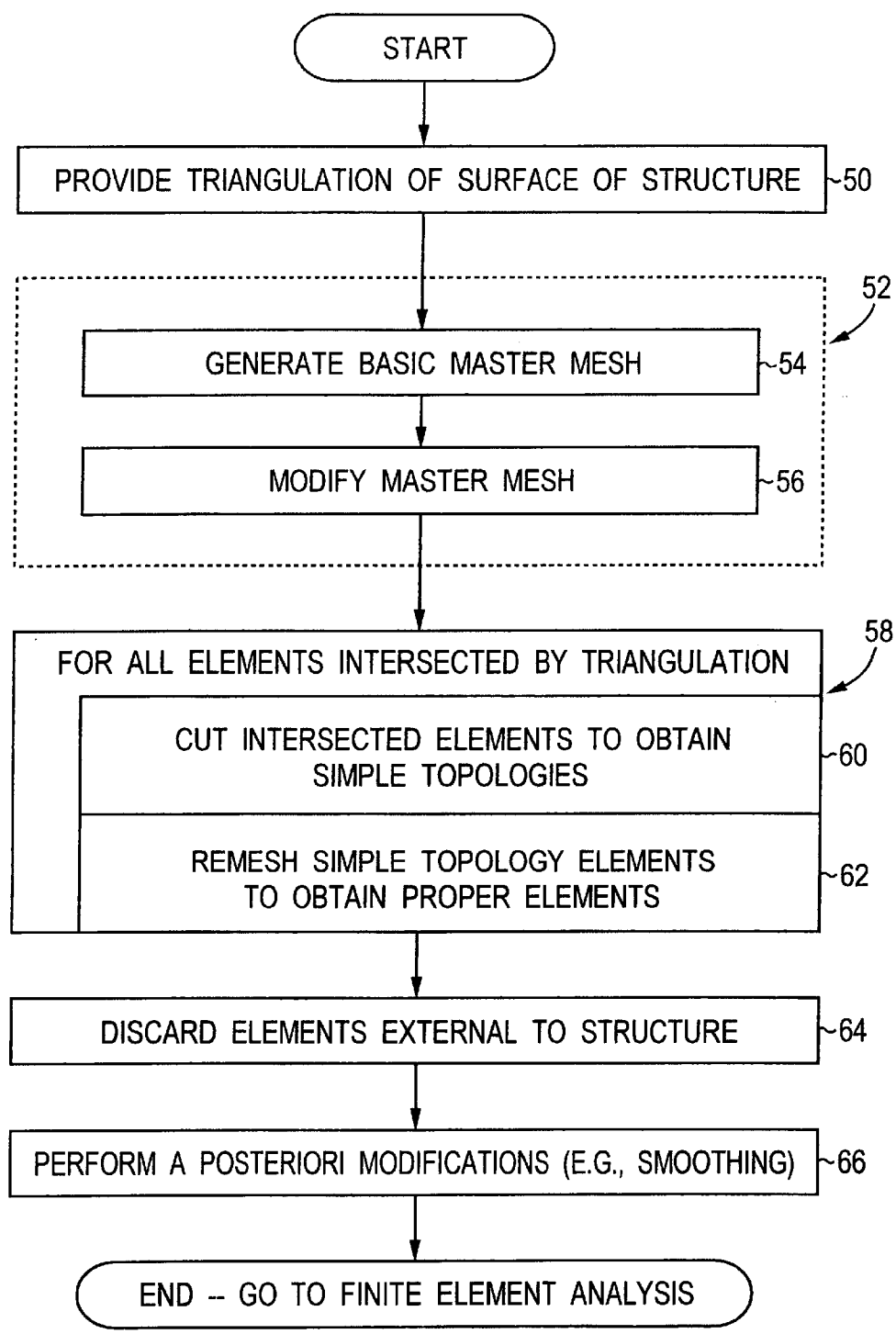
FIG. 14 shows a flow diagram of an embodiment of the present invention.

In order to mesh an arbitrary structure, this structure is initially described. The technique chosen in the present invention consists of a triangulation of the structure's surface. The method of the sample embodiment, as shown in FIG. 14, therefore starts with the step of providing a triangulation of the surface of the structure for which the three-dimensional mesh is to be generated (step 50). FIG. 1 and FIG. 3 each depict an example of such a triangulated structure 10 (only the front part of it is shown for the sake of clarity). The triangulated structure 10 to be meshed is a curved plate with constant thickness.

Nearly every finite element preprocessor is able to triangulate surfaces. Thus, the triangulation technique is known per se. It is readily available and moreover very robust. Since the triangulation is the basis for the further meshing, the quality of the hexahedral mesh is very much determined by the accuracy of the triangulation. Details of the structure which are not triangulated with appropriately small triangles will be missed by the hexahedral mesh.

For each meshing technique it is extremely important to catch the crucial characteristics of the structure, e.g. its edges and vertices. Assuming that the triangulation provided by the user contains all these details, a first analysis focuses on an inventorying of these topological characteristics based on the angle two adjacent triangles make. They are stored in linked lists for later usage during the cutting procedure. The technique of linked lists is chosen to guarantee short execution times. Indeed, good memory storage management is often crucial to the success of an automatic meshing procedure.

The next step in the method (step 52 in FIG. 14) is the step of providing a master mesh that will be cut by the triangulated structure 10. An example of the master mesh is shown in FIG. 1 with reference numeral 12 and in FIG. 3 with reference numeral 14 (only the back parts of the master meshes 12, 14 are depicted for the sake of clarity).

In the present sample embodiment, step 52 in FIG. 14 comprises a first sub-step 54 of generating a basic, non-optimized master mesh 12. This basic master mesh 12 is a pure 20-node brick element mesh encompassing the structure. In the present embodiment, the basic master mesh 12 is generated in an automatic way as a regular rectangular grid along the cartesian coordinate axes and it contains the complete triangulation. For example, the basic master mesh 12 shown in FIG. 1 was generated along the coordinate axes. The size of the elements is based on the mean value of the triangle side length in the triangulation.

More sophisticated schemes are used in alternative embodiments, such as the determination of preferred orientations of the geometric edges of the triangulation and the subsequent orientation of the rectangular grid. The user may also provide the master mesh explicitly, or he/she may modify some of the automatically selected parameters. For example, the user may chose an appropriate orientation of the structure before triangulating, such that a suitable geometric orientation of the geometric edges of the triangulation and the subsequent orientation of the rectangular grid is obtained.

The properties of the master mesh have an immediate effect on the quality of the final mesh. For instance, an appropriate orientation can avoid more complex cutting procedures leading to a smoother mesh. On the other hand, a master mesh which is too coarse can jeopardize the accurate modeling of small details. A typical situation in which the user might provide a master mesh explicitly arises if he/she wants to introduce additional details such as holes or scallops in an existing 20-node brick element mesh. In that case one can start from the existing mesh as master mesh and triangulate the additional details.

The second sub-step 56 of step 52 in FIG. 14 is the sub-step of modifying the basic master mesh 12 (FIG. 1). For this sub-step, all the edges of the basic master mesh 12 are catalogued and a check is performed which edges are intersected by the triangulation. An edge of a 20-node element is characterized by two end nodes and one middle node. If such an edge is intersected very close to its end nodes, it generally leads to a bad cutting geometry for all elements belonging to this edge because after cutting of the element very long and narrow or very small elements remain. To avoid such bad cutting geometries, the nodes belonging to the intersected edges are moved in such a way that the intersection point lies closer to the middle node of the edge. This is called the master mesh modification. It applies to element sides cut once only.

FIG. 2a shows how this mesh modification procedure works. Element edge p3-p4-p5 is cut by the triangulation in a point close to p3. The distances from the intersection point I to p3 and p5 are d1 and d2, respectively. The nodes are labeled such that d1<d2. The quantity $d=(d1+d2)/2$ is the mean of d1 and d2. If $|d-d1|/d<0.2$, the intersection point is deemed close enough to the middle node and no modification is made. Else, the radii $R1=(d1+d)/2$ and $R2=(d2+d)/2$ are calculated for future use.

Whether p3 and p5 are really moved depends on the existence of suitable element sides p1-p2-p3 and p5-p6-p7. Focusing on p1-p2-p3, an element side is looked for which:

does not belong to the elements containing side p3-p4-p5,
 makes an angle $\alpha \leq 60°$ with the extension of p3-p4-p5 (FIG. 2a), and
 is not cut twice or more by the triangulation.

If no suitable side p1-p2-p3 is found, node p3 is not moved. If more than one suitable side is found, the one with the smallest α is taken. If the search for p1 and p2 was successful, the distance d3 from p1 to the intersection point I is determined. If R1>0.75 d3, which can occur if element side p1-p2-p3 is much smaller than p3-p4-p5, node p3 is not moved. Finally, if p1-p2-p3 is not cut, R3 is determined by R3=(d3+R1)/2 and node p3 is moved to a position on p1-p2-p3 on a distance R1 from I, node p2 is moved on a distance R3 from I. On the other hand, if p1-p2-p3 is cut in the intersection point J (FIG. 2b), the distance d5 between the intersection points is calculated and R1 is replaced by R1=min(R1,0.50 d5). If R1≦5 d1, node p3 is not moved. Else, R3 is determined and nodes p2 and p3 are moved in the same way as for the uncut side. Mutatis mutandis, the same procedure applies to element side p5-p6-p7. Finally, all midside nodes not already moved belonging to any sides of which one of the end nodes was moved, are moved into the middle of their end nodes.

FIG. 3 illustrates this procedure for the curved plate. The modified master mesh 14 has been obtained from the basic master mesh 12 shown in FIG. 1 by moving the nodes belonging to sides intersected by the plate surfaces. Thus the cutting geometry is improved. This generally leads to significantly better cutting geometries.

After the final (modified) master mesh has been provided in step 52 (FIG. 14), all elements of the master mesh intersected by the triangulation are determined and further processed to obtain proper elements of the three-dimensional mesh (step 58). This step 58 is performed in two sub-steps 60, 62. In sub-step 60, intersected elements are cut in order to obtain elements having predetermined topological properties. Such elements will be defined as "simple elements" in the following. In sub-step 62, the simple elements are remeshed to form proper elements of the three-dimensional mesh, i.e. elements that have a topology acceptable for the three-dimensional mesh and the further finite element processing. According to one embodiment, this topology is that of hexahedral elements, in particular 20-node brick elements.

In preparation of sub-step 60, all elements intersected by the triangulation are determined and catalogued according to their cutting topology. A topology can be simple or complex. A topology is simple if the following two conditions are satisfied:

each edge of the element is cut at most once by the triangulation, and the topology leads to at most two parts after cutting by the triangulation.

All other topologies are called complex. They can be reduced to simple topologies through cutting in between two opposite faces of the element.

Figure 4:
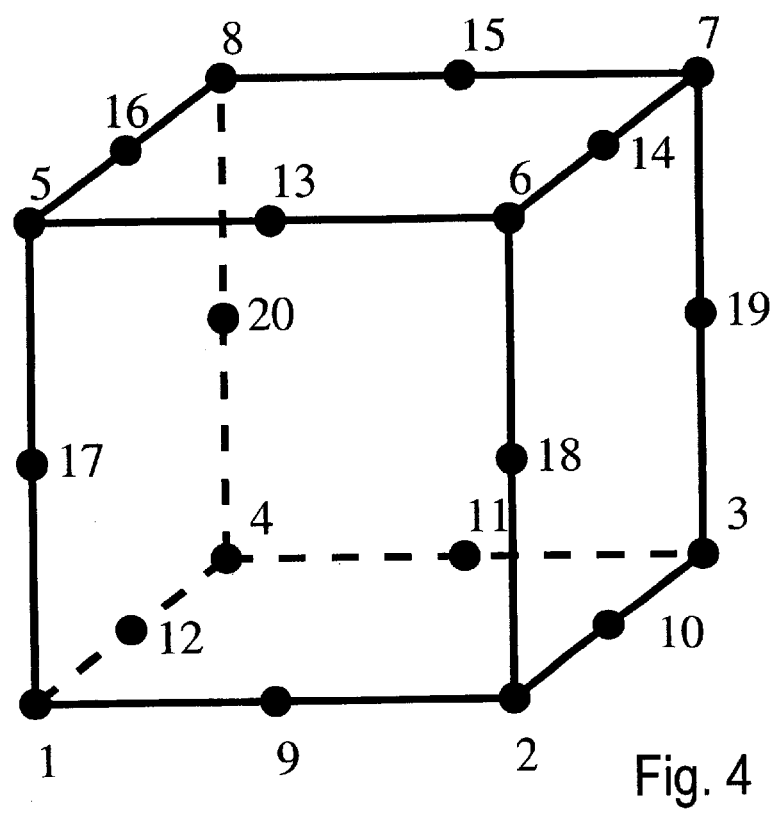
FIG. 4 depicts a numbering scheme for the 20-node brick element.
Figure 5:
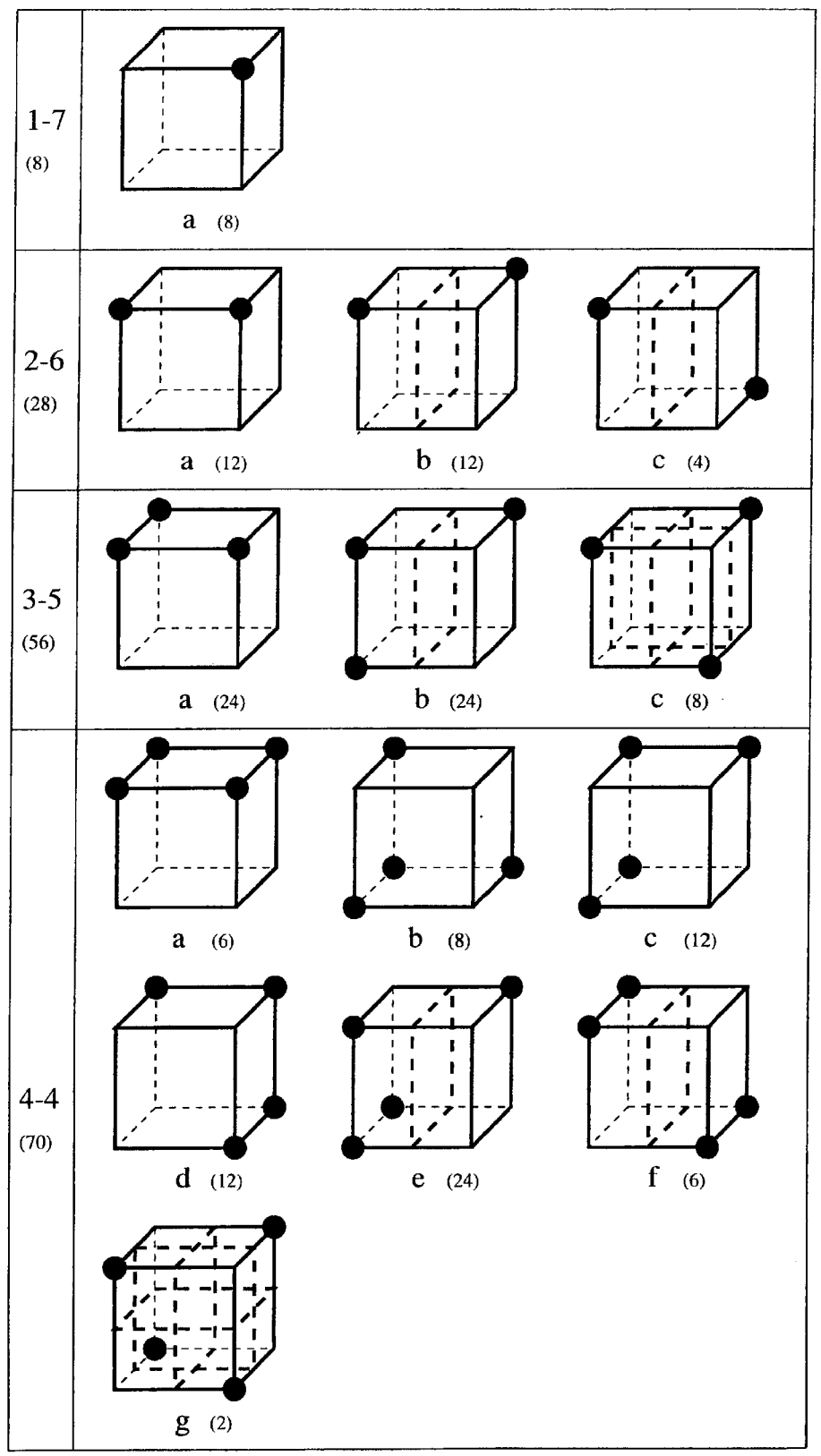
FIG. 5 gives an overview of the topologies with single cut edges.

The first condition is easy to check. The second, however, is more intricate. To proceed, a unique mathematical description of the topology is needed. To this end, the eight vertex nodes of the 20-node element are catalogued according to whether they lie inside (1) or outside (0) the structure. Ordering these bits according to the position of the nodes in the topology description of the element leads to a unique eight bit code. For instance, the code for topology 1–7(a) in FIG. 5 is 00000100, assuming that the node numbering corresponds to FIG. 4. Whether nodes inside the structure are assigned 1 or 0 is actually immaterial. Thus, for the sake of simplicity, only bit codes with a number of 0-bits greater than or equal to the number of 1-bits are considered. In FIG. 5 the black circles represent the 1-bits. This classification assumes that the edges are cut at most once.

Based on the number of 1-bits only, four different cases can be distinguished: 1–7, 2–6, 3–5 and 4–4 indicating the number of vertex nodes on each side of the triangulation. In case 1–7 only one topology arises. It is a simple one since it leads to maximum two element parts after cutting, no matter what the triangulation looks like. The numbers in brackets are the total number of variations corresponding to the particular case or topology. For instance, topology 1–7(a) has 8 variations corresponding to the possible ways in which the topology can occur: there are 8 ways to choose one node out of 8 nodes.

Cases 2–6 and 3–5 can be subdivided into one simple topology and two complex topologies each. For instance, knowing that each edge is cut at most once, topology 2–6(a) can lead to at most two parts after cutting. On the other hand, topology 2–6(b) can lead to three parts, by cutting each corner separately. However, it does not have to: a cutting leading to two parts is also possible. This, however, is immaterial to the definition of a simple topology. The fact that the topology can lead (but does not always have to) to more than two parts is sufficient to classify it as a complex topology. The dashed lines in FIG. 5 indicate how the complex topology can be reduced to simple ones by cutting.

In case 4–4 there are four simple topologies and three complex topologies. Topology 4–4(d) is actually the mirror topology of 4–4(c). Although topology 4–4(g) can also be reduced to simple topologies by cutting the element in four elements only, a cutting in eight elements is preferred out of symmetry reasons.

After classifying the topologies into simple and complex topologies, the complex ones are reduced to simple ones in sub-step 60 (FIG. 14) by cutting in between two opposite element faces. This cutting is performed in two stages: first all elements having edges which are intersected more than once are cut until the number of intersection points is everywhere less than two. Then, the newly generated elements are reclassified and the remaining complex topologies are cut according to the scheme visualized by the dashed lines in FIG. 5.

Figure 6:
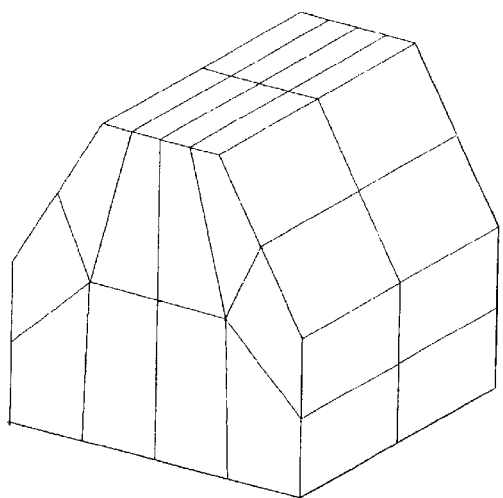
FIG. 6 gives an example of an element having double cut edges.

In an embodiment of the present invention, when the elements having edges intersected more than once are cut (reducing them to simple or complex topologies covered by FIG. 5), only edges cut no more than two times are covered. However, an extension to higher order cuttings is contemplated for alternative embodiments, although an overall finer master mesh might be a better solution in that case. If an edge is intersected twice, a cutting plane is introduced in between the intersection points. This is illustrated in FIG. 6 showing an element in which two of the upper edges are cut twice. A vertical cutting plane separating the intersection points was introduced leading to two new elements belonging to the simple topology 2–6(a). Subsequently, the two new elements were remeshed. The remeshing schemes for the simple topologies are treated below.

If an element is cut, the cutting cannot generally stop at the boundaries of the element. Indeed, an incompatibility with the neighboring elements arises, which can be removed by the introduction of multiple point constraints (MPCs) or continued cutting into the adjacent elements. If the user is willing to allow for multiple point constraints in the final mesh, the cutting plane does not have to be extended to elements satisfying the following two conditions:

they contain no double cut edges, and their edges which would be intersected by an extension of the cutting plane are not intersected by the triangulation.

However, if the user prefers to avoid any multiple point constraint, the cutting plane can be extended throughout the whole master mesh.

Once all double intersected edges are cut in half, the newly generated elements are reclassified according to their topology. At this stage, all complex topologies are covered by FIG. 5. The cutting planes are introduced in the way pictured by the dashed lines in FIG. 5.

Figure 7A:
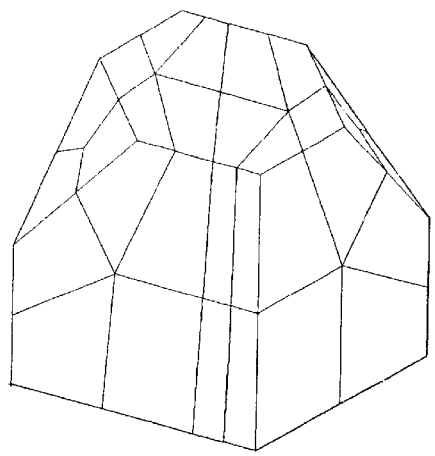
FIG. 7a–FIG. 7h show examples of complex topologies as well as the cutting thereof to obtain simple topologies.
Figure 7B:
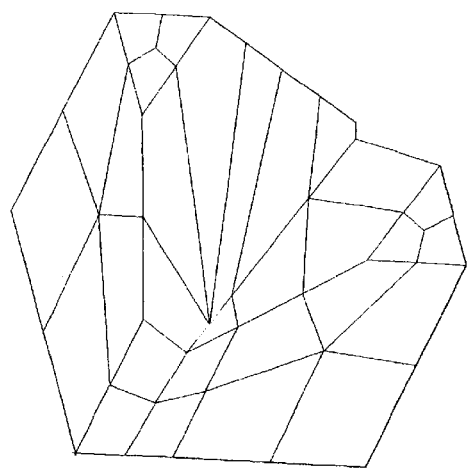
Figure 7C:
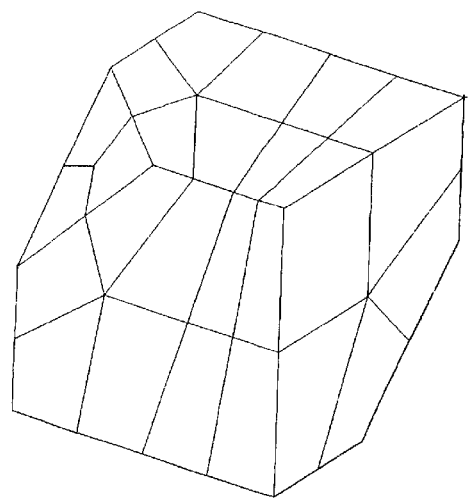
Figure 7D:
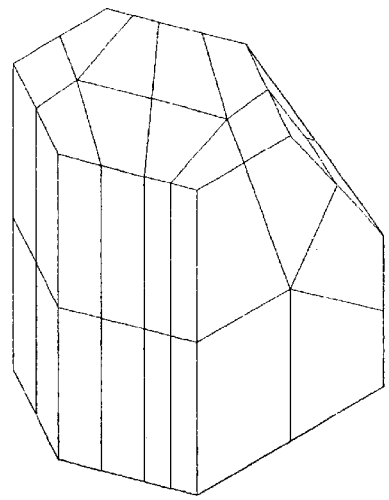
Figure 7E:
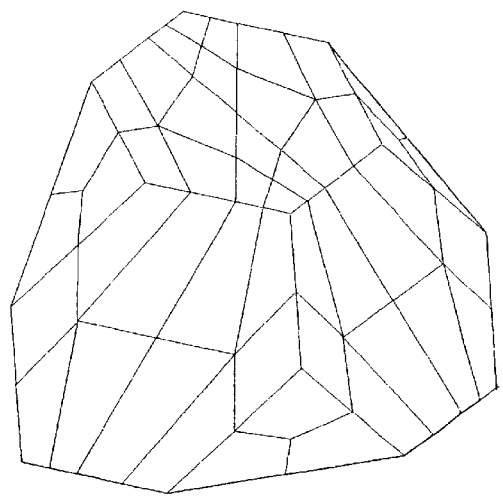
Figure 7F:
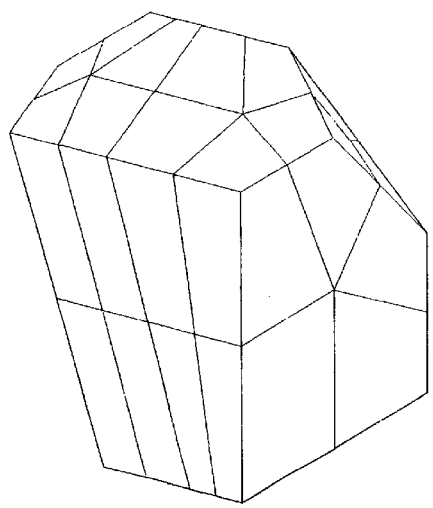
Figure 7G:
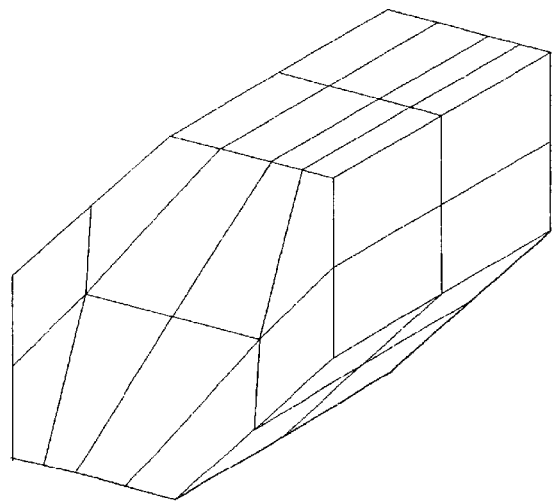
Figure 7H:
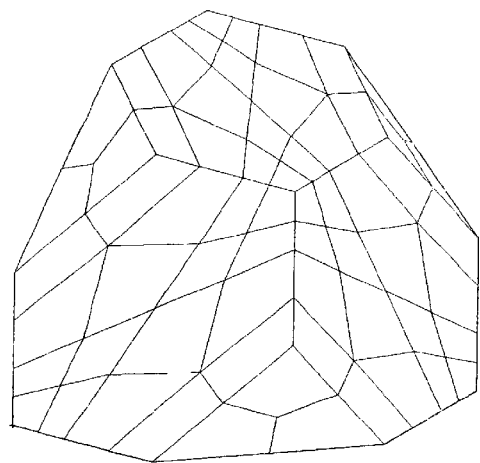

FIG. 7a–FIG. 7h give examples of each of the complex topologies, and show how the cutting is performed, followed by a remeshing of the resulting elements. The way any of these complex topologies arises is by no means unique. This is illustrated by FIG. 7a and FIG. 7b which both correspond to topology 2–6(b). In FIG. 7a it leads to three parts, whereas in FIG. 7b two parts are generated. FIG. 7c depicts complex topology 2–6(c), FIG. 7d shows complex topology 3–5(b), FIG. 7e shows complex topology 3–5(c), FIG. 7f shows complex topology 4–4(e), FIG. 7g shows complex topology 4–4(f), and FIG. 7h shows complex topology 4–4(g). In each of FIG. 7a–FIG. 7h, only one of the parts is shown. The orientation of the elements was chosen such that a direct comparison with FIG. 5 is possible.

After sub-step 60 (FIG. 14), all elements belong to simple topologies. A remeshing of these simple topology elements is performed in sub-step 62. The objective of sub-step 62 is to generate proper elements of the three-dimensional mesh. In other words, substep 62 consists in the application of remeshing schemes that have been developed for each of the simple topologies. In the present sample embodiment, the remeshing schemes satisfy following requirements:

only genuine 20-node brick elements are generated,
compatibility between different topologies is ensured,
the curvature of the structure's surface, expressed by differently oriented triangles in the triangulation, can be adequately modeled, and
edges and vertices can be accurately modeled.

Figure 8A:
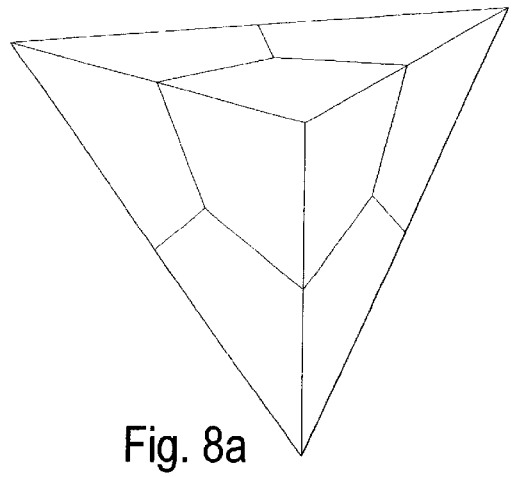
FIG. 8a–FIG. 8k show examples of the remeshing of simple topologies.
Figure 8B:
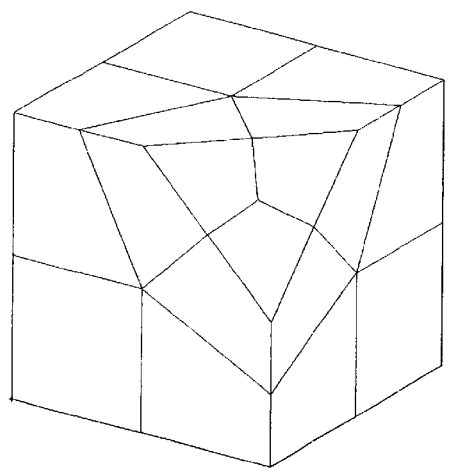
Figure 8C:
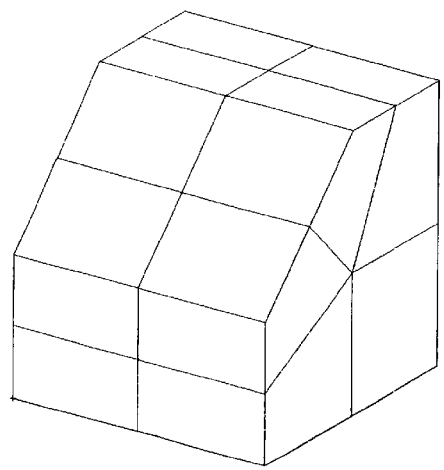
Figure 8D:
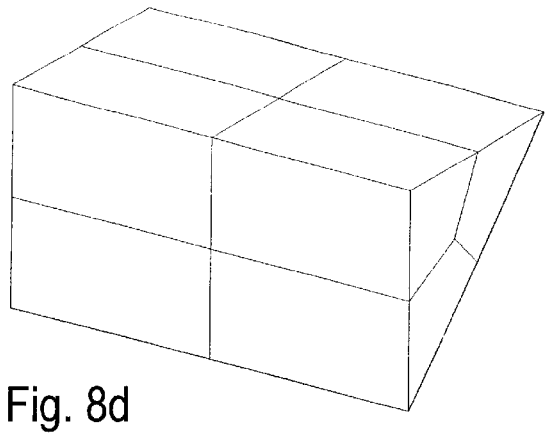
Figure 8E:
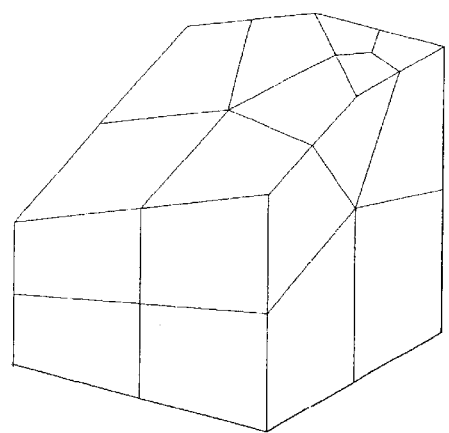
Figure 8F:
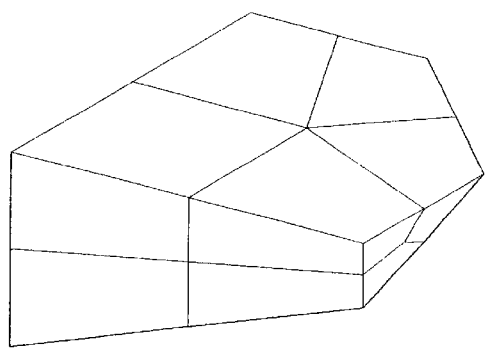
Figure 8G:
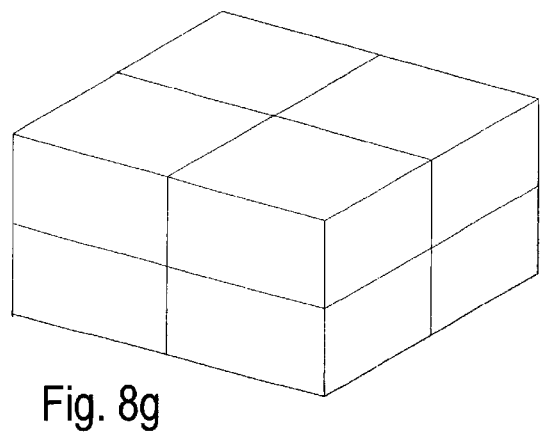
Figure 8H:
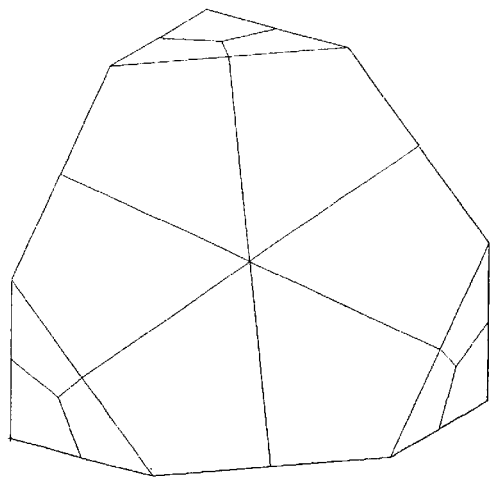
Figure 8I:
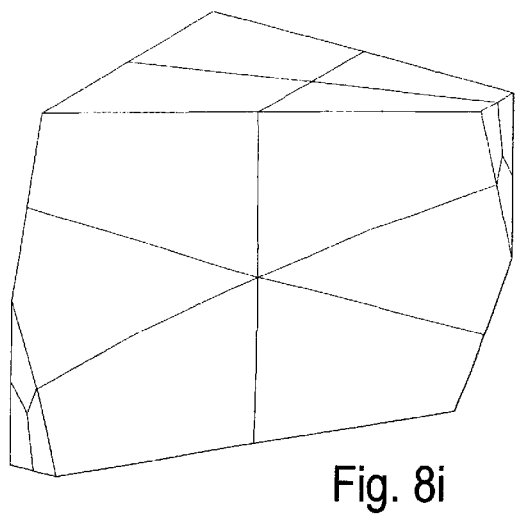
Figure 8J:
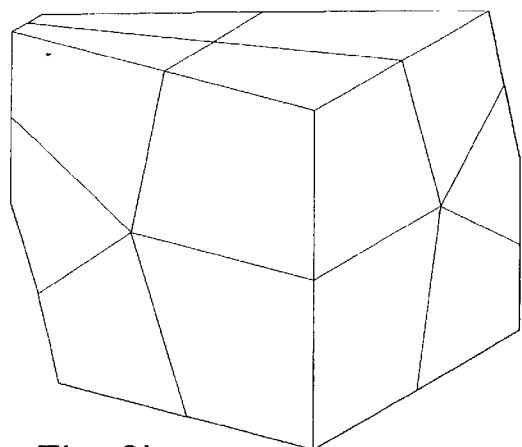
Figure 8K:
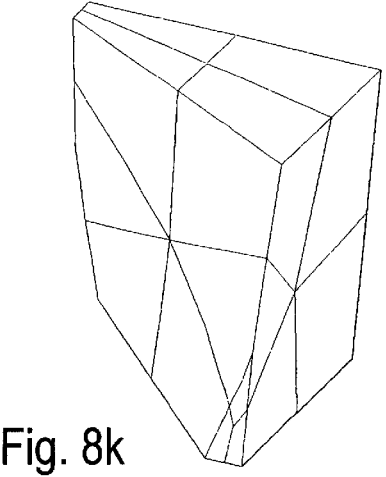

The remeshing schemes are illustrated in FIG. 8a–FIG. 8k. FIG. 8a shows the remeshing of the first part resulting from simple topology 1–7(a), and FIG. 8b shows the remeshing of the second part for this topology. FIG. 8c shows the remeshing of the first part resulting from simple topology 2–6(a), and FIG. 8d shows the remeshing of the second part for this topology. FIG. 8e shows the remeshing of the first part resulting from simple topology 3–5(a), and FIG. 8f shows the remeshing of the second part for this topology. FIG. 8g shows the remeshing for simple topology 4–4(a), and FIG. 8h shows the remeshing for simple topology 4–4(b). FIG. 8i shows the remeshing of the first part resulting from simple topology 4–4(c), and FIG. 8j shows the remeshing of the second part for this topology. FIG. 8k shows the remeshing for one part of simple topology 4–4(d).

The generation of the elements obeys to some extent the midpoint subdivision rules derived in the article by T. S. Li, R. M. McKeag and C. G. Armstrong, "Hexahedral meshing using midpoint subdivision and integer programming", Comput. Methods Appl. Mech. Engng., 124, 171–193, 1995, although the position of the new nodes on the element faces and inside the element has been modified to get more stable elements within moderately deformed and twisted elements.

All newly generated elements in FIG. 8a–FIG. 8k are genuine 20-node brick elements. Furthermore, care is taken that the new meshes in adjacent elements with different topologies are compatible. For instance, there is a smooth transition between the new elements in FIG. 8b (topology 1–7(a)) and the new elements in FIG. 8c (topology 2–6(a)), and thus two adjacent elements with these topologies are consistently connected.

Figure 9:
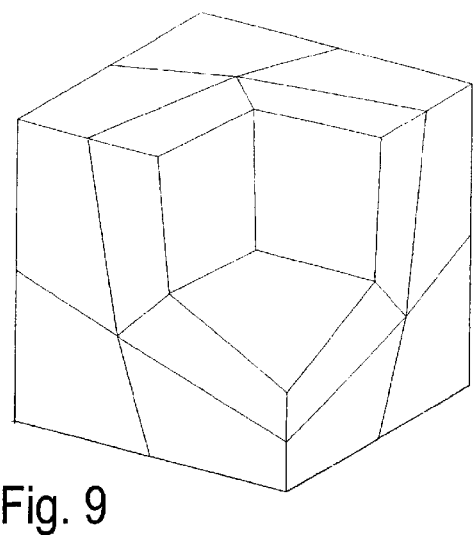
FIG. 9 shows an example of shaping a vertex on the basis of the topology shown in FIG. 8b.

Most element faces bordering the triangulation in FIG. 8a–FIG. 8k are plane. The accommodation of curved surfaces (non-plane triangulations) is achieved through projection of the newly generated nodes onto the triangulation. However, before doing this, care is taken that edges and vertices in the triangulation are accurately modeled. To this end, each remeshing scheme has a node within the cutting shape, which is able to accurately model a vertex of the triangulation. For topology (1–7)a this is the node common to all three elements bordering the cutting shape in FIG. 8b. This node can be freely used to model a vertex of the structure by positioning it on the vertex location. This is illustrated in FIG. 9. Similarly, the other nodes in the cutting shape can be used to model edges of the triangulation. This can also be seen in FIG. 9.

Figure 10A:
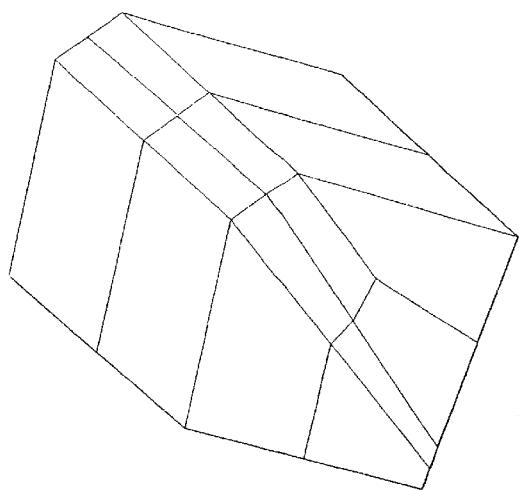
FIG. 10a and FIG. 10b illustrate examples of shaping two edges for the two parts shown in FIG. 8c and FIG. 8d.
Figure 10B:
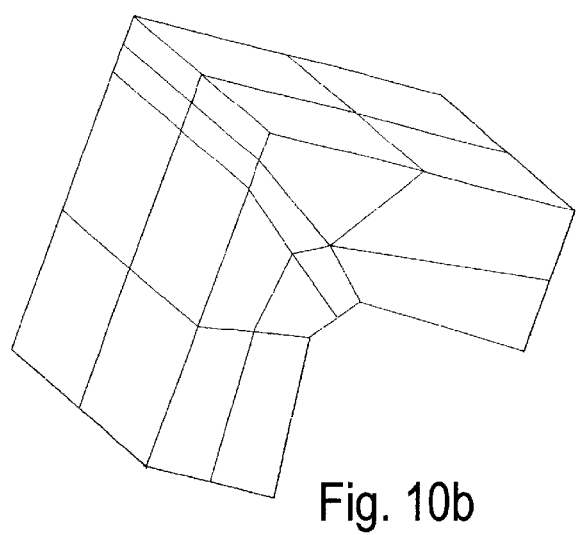

It is clear that each simple topology can model only a limited number of vertices and edges. If very closely located vertices or edges occur, the master mesh has to be refined. Alternatively, an additional cutting can be performed after the reduction to simple topologies and before remeshing. This is shown in FIG. 10a and FIG. 10b where the triangulation has led to a 2–6(b) topology with two edges close together. A cutting plane was positioned in between these edges, leading to two simple topologies containing one edge each. Thereafter, remeshing was performed. This situation frequently occurs when modeling thin shell or plate structures.

When step 58 (FIG. 14) has been completed and all intersected elements have been processed (i.e., cut and remeshed), the elements not belonging to the structure are discarded. This is done in step 64. What remains is a mesh consisting of a thin layer of small elements at the surface of the structure, connected through multiple point constraints to the underlying coarser master elements.

The mesh resulting from step 64 can already be satisfactory to the user since most stresses of interest occur at the free surface. However, in some embodiments of the invention, the multiple point constraints are be pushed to deeper layers by remeshing additional inner layers of elements, if the user wishes to do so. This is possible since all uncut element faces of the simple topologies are remeshed in the same way, leading to four new faces as illustrated by the upper surface of FIG. 10b. Meshing additional adjacent element layers is achieved by subdividing these adjacent elements in eight new elements. By doing so, the MPCs are moved one layer deeper into the structure. This is paid for by additional elements leading to increased computational times. Ultimately, all MPCs can be removed by pursuing the technique until exhaustion leaving a MPC-less pure 20-node brick element mesh.

Smoothing procedures can further improve the mesh quality and are therefore performed in some embodiments of the invention. In the present exemplary embodiment, two different techniques are applied in step 66 (FIG. 14). In alternative embodiments, step 66 can be omitted or other or additional smoothing and/or modification steps can be performed.

The first smoothing procedure performed in step 66 consists of a robust optimization routine based on the Nelder-Mead method (see G. E. Gill, W. Murray and M. H. Wright, Practical optimization, Academic Press, London, 1981). Purpose of the optimization is to ensure that the Jacobian determinant is positive in all integration points of the newly created elements. A negative Jacobian determinant corresponds to a negative volume and surely leads to a crash of every finite element code. First, all elements in which a negative Jacobian occurs, if any, are determined. The end nodes belonging to each of these elements are subsequently allowed to move and the smallest Jacobian determinant in the integration points of the element and its neighbors is maximized. Furthermore, the middle nodes are kept within a reasonable distance from the geometric middle point of their adjacent end nodes. Experience has shown that this method is very effective, but it does not necessarily result in visually pleasing meshes.

The second smoothing procedure performed in step 66 consists of a weighted Laplace smoothing as described in the article by T. D. Blacker and M. B. Stephenson, "Paving: a new approach to automated quadrilateral mesh generation", Int. J. Numer. Meth. Engng., 32, 811–847, 1991. In this procedure, each node is moved depending on the position of its neighbors. It usually results in a visually improved mesh.

However, there is no guarantee that the Jacobian determinant in some elements might not deteriorate. Examples of this procedure can be found in a recent article on crack propagation calculations by the present inventor having the title "Cutting of a 3-D finite element mesh for automatic mode I crack propagation calculations", Int. J. Numer. Meth. Engng., 42, 749–772, 1998.

The method of the present invention is completed with the a posteriori modifications. The generated three-dimensional mesh can now be used for subsequent three-dimensional structural finite element calculations. The techniques used for this calculations are well known per se and are not the subject of the present invention.

In the following, three examples are presented to illustrate the effectiveness of the method.

Figure 11A:
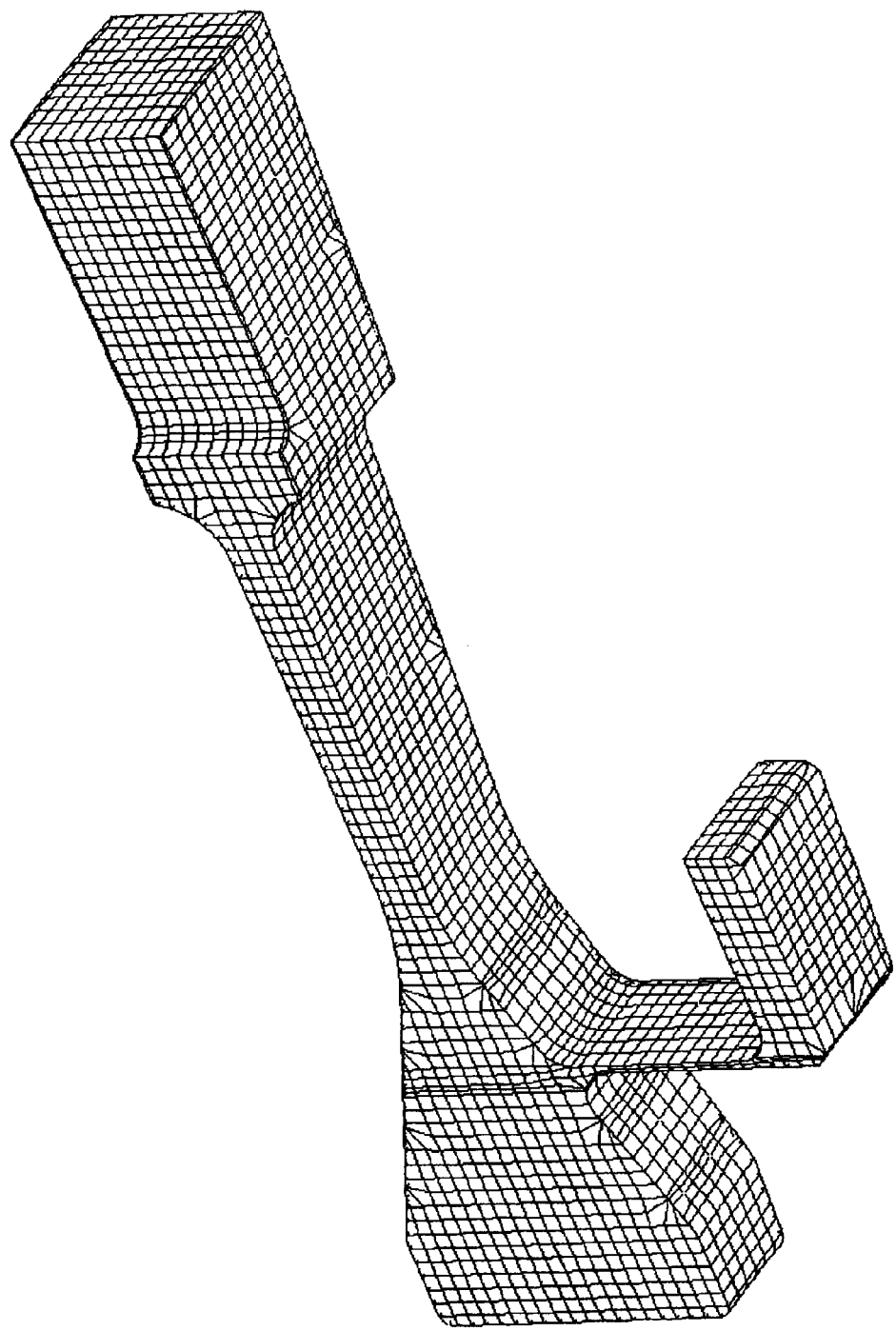
FIG. 11a shows a turbine disk structure meshed by the method according to an embodiment of the present invention.
Figure 11B:
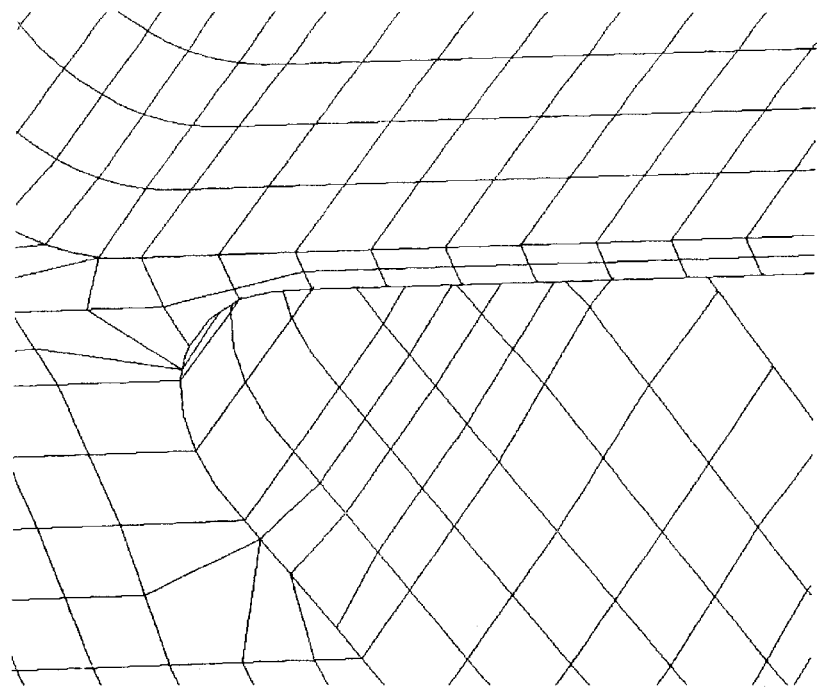

The first example is an aircraft engine disk segment (FIG. 11a) with U-notch and drive arm (FIG. 11b). The master mesh consisted of a regular rectangular grid. If the segment had included a larger angle, one could also consider to take an axisymmetric master mesh. The drive arm is very thin leading to doubly cut edges. Thus, additional cutting was performed before remeshing. This is shown in FIG. 11b: on the level of the drive arm there is an increase in mesh density. After remeshing a regular and smooth mesh results. No additional layer remeshing or smoothing was performed. Linear elastic stress calculations yielded values comparable to those obtained with a standard mesh generator.

The second example is a machine part with different levels of detail (FIG. 12): the external shape of the part and the big hole in the middle constitute a rather coarse level, whereas the several small holes represent a much finer level of detail. Meshing this part in one step would require a very fine master mesh to catch the small holes. Therefore, a two-step procedure is taken. First, the external geometry and the big hole are inserted, and a MPC-less mesh is generated. Due to the cutting procedure used this mesh has about eight times more elements than the original master mesh. Thus, by using this mesh as master mesh for the insertion of the small holes, a higher level of accuracy can be achieved. To limit the amount of elements, the remeshing in the second step was limited to the intersected elements, and appropriate MPCs were automatically generated.

Figure 12:
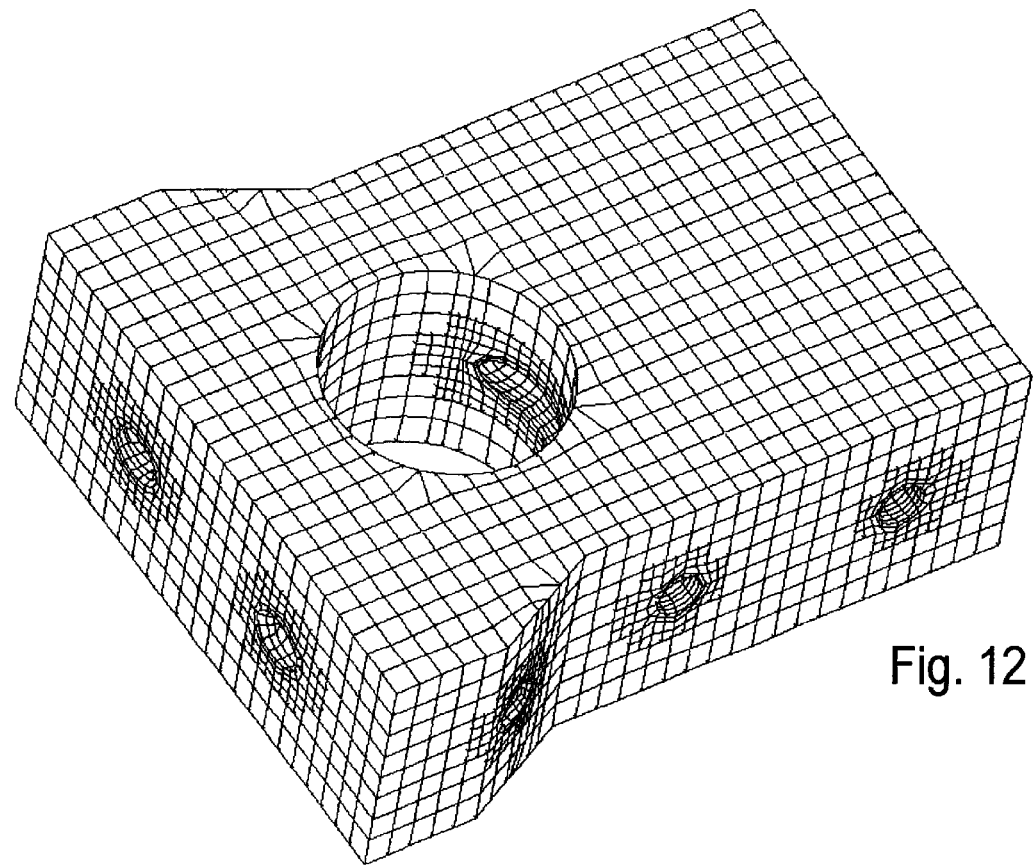
FIG. 12 shows a structure with holes meshed by the method according to an embodiment of the present invention.

Especially to be noticed in FIG. 12 are the accurate modeling of the intersection of one of the small holes with the large hole and the transition of the fine mesh to the coarse mesh around the sides of the small holes. At the boundary between both meshes the MPCs are applied. Again, the stress field is smooth (also across the MPCs) and corresponds to what is expected.

Figure 13A:
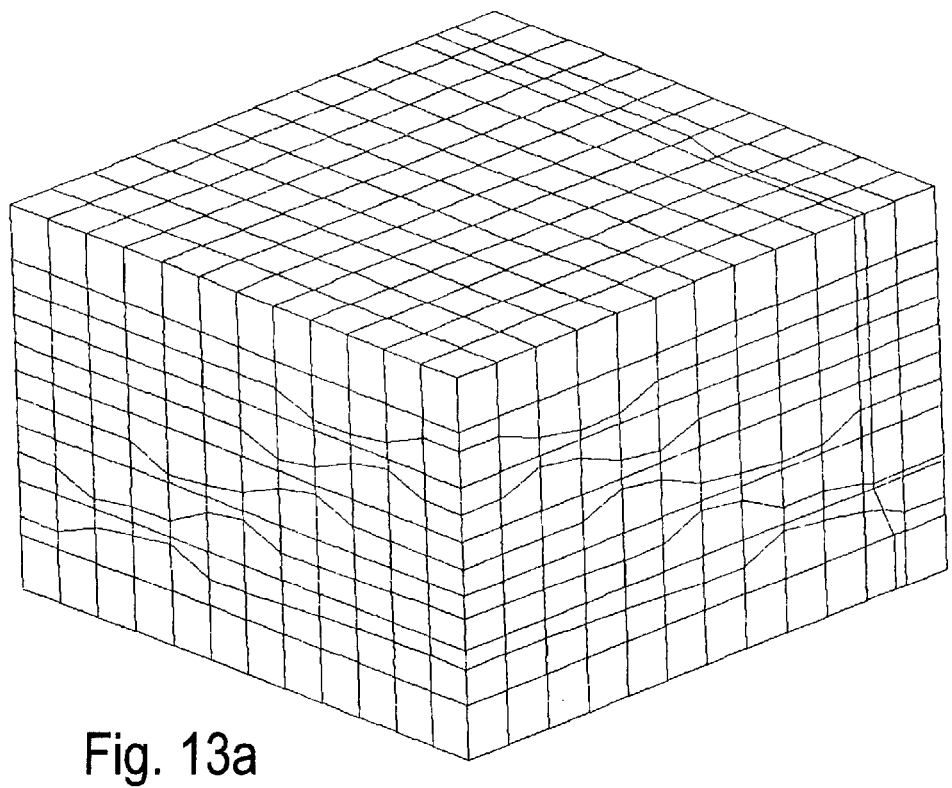
FIG. 13a shows the cutting of a master mesh to obtain single cut edges only.
Figure 13B:
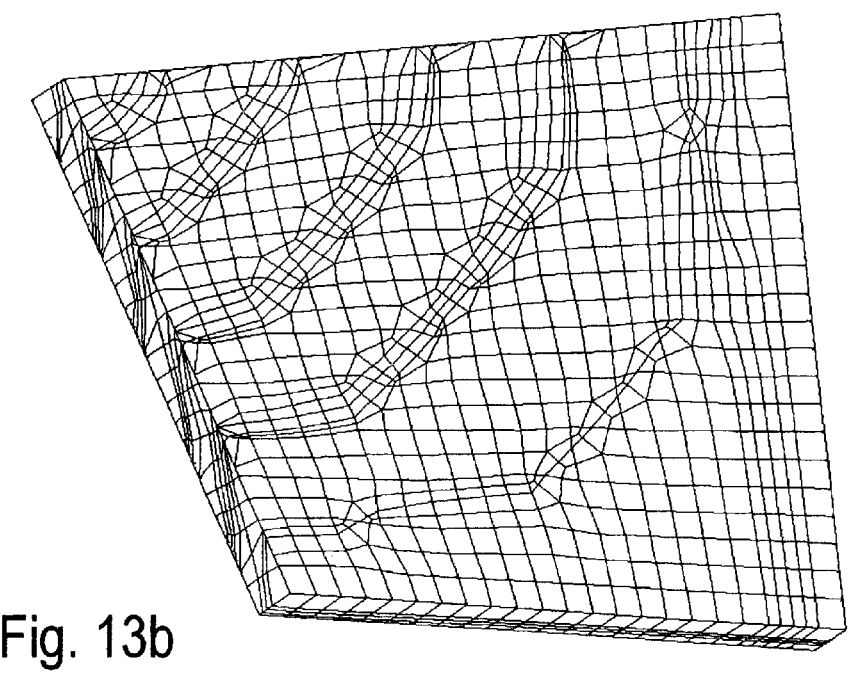
FIG. 13b shows the curved plate structure of FIG. 1 and FIG. 3 meshed by the method according to an embodiment of the present invention.

The third example (FIG. 13b) is the curved plate already shown in FIG. 1 and FIG. 3: its thickness to length ratio is 1:10. Principally, the present method is not ideal for such slender structures. Indeed, meshing the midsurface with shell elements and expanding them in the thickness direction leads to a much smoother mesh. However, also bulky structures can exhibit locally slender details and a general meshing program must be able to tackle such situations.

The master mesh was generated in an automatic way and quite a few complex topologies were detected, all of them covered by FIG. 5, i.e. no edges were cut more than once. The reduction of the complex geometries to simple ones was performed through cutting leading to a new master mesh shown in FIG. 13a. Several element layers were cut in different directions, leading to a local refinement of the master mesh. Then, the simple topologies were remeshed leading to the mesh in FIG. 13b. All MPCs were removed through continued remeshing.

The final mesh consisted of 5,136 elements and 24,117 nodes. The run time of the meshing procedure was about 45 seconds on an average workstation. No additional smoothing was performed, and all Jacobian determinants were positive. The mesh clearly shows the nature of the master mesh. Keeping the left face in FIG. 13b fixed in all directions, and pulling on the other end in the negative z-direction led to normal stresses exhibiting the expected bending distribution. This example shows that even without additional smoothing good results can be obtained for structures which do not have an ideal geometry for the automatic meshing procedure of the present invention.

What is claimed is:

1. A method for generating a three-dimensional mesh for a structure, said method comprising the steps of:

providing a triangulation of the surface of said structure;

providing a three-dimensional master mesh which encompasses said structure, said master mesh having one or more component elements;

processing at least those component elements of the three-dimensional master mesh that are intersected by said triangulation such that component elements internal to said structure correspond to elements of said three-dimensional mesh each having a first predetermined topological property; and discarding component elements of the master mesh external to said structure;

wherein the processing step includes performing at least one of the steps of cutting and remeshing at least those component elements of the master mesh that are intersected by said triangulation.

2. The method of claim 1, wherein said three-dimensional mesh is a hexahedral mesh.

3. The method of claim 2, wherein the hexahedral mesh includes 20-node elements.

4. The method of claim 2, wherein said first predetermined topological property is that each of said elements of said three-dimensional mesh is a hexahedral element.

5. The method of claim 4 wherein said hexahedral element is a 20-node brick element.

6. The method of claim 1, wherein the step of cutting comprises cutting component elements intersected by said triangulation according to a first set of predetermined rules in order to generate cut elements each having a second predetermined topological property, and wherein the step of remeshing comprises remeshing said cut elements having said second predetermined topological property according to a second set of predetermined rules in order to generate elements of said three-dimensional mesh each having said first predetermined topological property.

7. The method of claim 6, wherein said second predetermined topological property comprises a first condition that each edge of each cut element is intersected only once by said triangulation, and a second condition that each cut element is divided into at most two parts by said intersection with said triangulation.

8. The method of claim 1, wherein the step of providing a three-dimensional master mesh which encompasses said structure comprises the sub-steps of:

generating a non-optimized master mesh, and modifying said non-optimized master mesh such that each edge that are intersected by said triangulation close to its end nodes is moved.

9. The method of claim 8, wherein said non-optimized master mesh is a regular rectangular grid.

10. The method of claim 1, further comprising the step of performing at least one a posteriori modification to said elements of said three-dimensional mesh.

11. The method of claim 10, wherein said at least one a posteriori modification is a smoothing operation.

* * * * *

UNITED STATES PATENT AND TRADEMARK OFFICE
CERTIFICATE OF CORRECTION

PATENT NO. : 6,804,635 B1
DATED : October 12, 2004
INVENTOR(S) : Dhondt

It is certified that error appears in the above-identified patent and that said Letters Patent is hereby corrected as shown below:

Column 10,
Line 57, change "edge that are intersected by said triangulation close to" to -- edge that is intersected by said trianglation close to --.

Signed and Sealed this

Fifth Day of April, 2005

JON W. DUDAS
*Director of the United States Patent and Trademark Office*